United States Patent [19]

Kreutz

[11] 4,129,782

[45] Dec. 12, 1978

[54] CURVED LOCATION-SENSITIVE PROPORTIONAL COUNTER TUBE

[75] Inventor: Werner Kreutz, Staufen, Fed. Rep. of Germany

[73] Assignee: M. Braun GmbH, Oberschleissheim, Fed. Rep. of Germany

[21] Appl. No.: 827,605

[22] Filed: Aug. 25, 1977

[30] Foreign Application Priority Data

Nov. 4, 1976 [DE] Fed. Rep. of Germany ....... 2650607

[51] Int. Cl.$^2$ .............................................. G01T 1/18

[52] U.S. Cl. ...................................... 250/379; 250/383

[58] Field of Search ............... 250/374, 375, 379, 382, 250/383, 385; 313/93

[56] References Cited

U.S. PATENT DOCUMENTS

| | | | |
|---|---|---|---|
| 3,828,192 | 8/1974 | Morsell | 250/379 X |
| 3,935,464 | 1/1976 | Zingaro | 250/379 |

*Primary Examiner*—Davis L. Willis

*Attorney, Agent, or Firm*—Scully, Scott, Murphy & Presser

[57] ABSTRACT

A curved location- or positionally-sensitive proportional counter tube having a trough-shaped cathode in a counting chamber. A curved resiliently elastic wire forming the anode extends longitudinally through the curved counting chamber in conformance with the curvature of the latter. Suitable fastening arrangements engage the ends of the wire so as to mount the wire in asymmetrical relationship to a counter tube window and equidistantly from the side walls of the cathode trough.

6 Claims, 3 Drawing Figures

CURVED LOCATION-SENSITIVE PROPORTIONAL COUNTER TUBE

BACKGROUND OF THE INVENTION

1. Field of the Invention

The present invention relates to a curved positionally- or location-sensitive proportional Geiger or counter tube with a counting chamber which is lined with a trough-shaped metallic layer introduced in or vapor-deposited on an insulating body as a cathode, which is gas-tightly covered on its longitudinal side through the intermediary of a conductive and radiation-transmissive foil as a counter tube window, and traversed along its longitudinal direction by a counter tube wire forming an anode and which is maintained stretched equidistantly from the metallic side trough walls, and which is fastened at both sides thereof in the insulating body and connected with the electrical elements of amplifiers.

2. Discussion of the Prior Art

In applicant's German Patent Application No. P 26 49 192.9 there is disclosed a counter tube which is particularly adapted for the registration of X-ray diffraction diagrams through its high resolution of below 50 μm. Through the finite depth of the counter tube, in essence, the counter tube trough forming the cathode, a considerable degree of blurring (depth blurring) is encountered relative to the absolute positional resolution. The reason for this blurring is the characteristic of the counter tube to register the location of an X-ray quantum at the location at which there is liberated the primary ionization. An X-ray quantum possesses a predetermined probability along its path through the depth of the trough of the counter tube to initiate this primary process. The thus produced charge is, however, accelerated perpendicularly towards the counter tube wire and not in the direction of the incident X-ray. Only when the X-ray enters the counter tube perpendicular to the counter tube wire, does the direction of the accelerated charge coincide with the direction of the radiation. The depth blurring which occurs thereby depends upon the angle of the X-ray relative to the counter tube wire, and disappears upon the perpendicular incident radiation onto the counter tube wire.

In the recording of diffraction spectrums through the utilization of a point focus, the X-radiation which is to be determined is radiated spherically symmetric, meaning, the diffractive reflexes of the X-radiation which are to be obtained are located along circular arcs. The advantage of a counter tube to integratingly measure all ionizing X-ray quantums perpendicular to the wire for linear reflexes lying in one plane, has a disadvantage effect in the recording of arcuately shaped reflexes through a spreading of the positional or locational impulses, and thereby, in a reduction in the resolution capacity (curve blurring), then, as with the previously mentioned depth blurring, the counter tube projects the locations of the primary ionization through incident X-ray quantums perpendicularly onto the counter tube wire. For the arcuately shaped reflex this signifies a projection of its curve entering the counter tube onto the counter tube wire.

SUMMARY OF THE INVENTION

Accordingly, it is an object of the present invention to provide a counter tube through the intermediary of which, and by a single measuring sequence, there can be determined with the desired high resolution or definition capacity, collective reflexes in the arcuately curved focusing plane.

The foregoing object is inventively attained in a proportionality counter tube of the above-mentioned type, wherein the counting chamber is curved along its longitudinal direction at a constant rate of curvature, and in which a resiliently elastic wire is employed as the counter tube wire which is clamped at both ends thereof by means of fastening arrangements located in the insulating body in a curved position which conforms to the constant curvature of the counting chamber, or respectively the cathode trough, and which is retained asymmetrically away from the concavely curved counter tube aperture and equidistantly relative to the cathode trough base surface.

Heretofore, for a curved focusing plane it has only been possible to provide for a measurement in a single measuring sequence by means of the classic method with the utilization of a photographic film. Heretofore, with counter tubes, for curved focusing planes the determination of the reflexes was possible only through an angular movement of the counter tube (scanning) in effect, by means of a plurality of measuring sequences.

The curvature of the counting chamber and, correspondingly, that of the counter tube wire, is suitably in conformance with the Goniometer radius of the employed X-ray apparatus. Until now it has been held as not possible to create a curved counter tube since, in the suspension of the counter tube wire having a constant curvature in correspondance with the curvature of the cathode trough, and in the precise equidistant spacing to the trough walls with consideration being given to the fineness of the counter tube wire, an insurmountable difficulty has been thought to be present. Through utilization of a spring-elastic counter tube wire and a bending thereof to only such an extent whereby the wire is always stressed below its elastic limit, and through the configuration of the fastening arrangements so that they retain the spring-elastic wire from both ends thereof at a predetermined curvature, and through additional equidistant displacement of the wire from the middle between the aperture and the trough base wall in the direction towards the trough back wall, the mentioned problem has been solved in a surprising manner. By means of the displacement of the wire from its central position towards the trough back wall, the electrical field of the trough assumes the stabilization of the wire guidance.

In a suitable configuration of the invention, the fastening arrangements for the counter tube wire each, respectively, consists of a gripping member which is cast or set into the sealing compound of the insulating body centrally of the cathode trough cross-section, which is bent at a curvature in conformance with the constant curvature of the counting chamber, and wherein the counter tube wire end, over a length facilitated by the curved gripping of the wire, is inserted into a curved bore centrally located the gripping body, and is then soldered.

BRIEF DESCRIPTION OF THE DRAWINGS

Reference may now be had to an exemplary embodiment of an inventive counter tube described in connection with the following detailed description, taken in conjunction with the accompanying drawings; in which.

DETAILED DESCRIPTION

Figure 1:
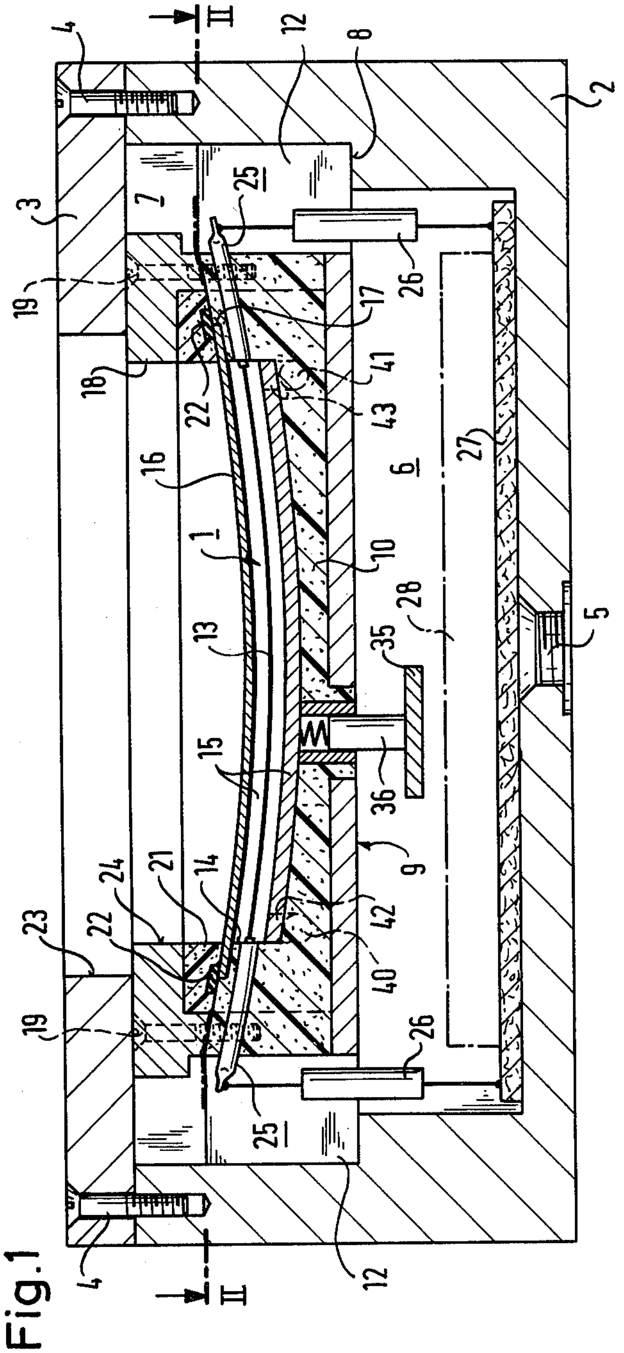
FIG. 1 illustrates a vertical section through a counter tube constructed pursuant to the invention.
Figure 2:
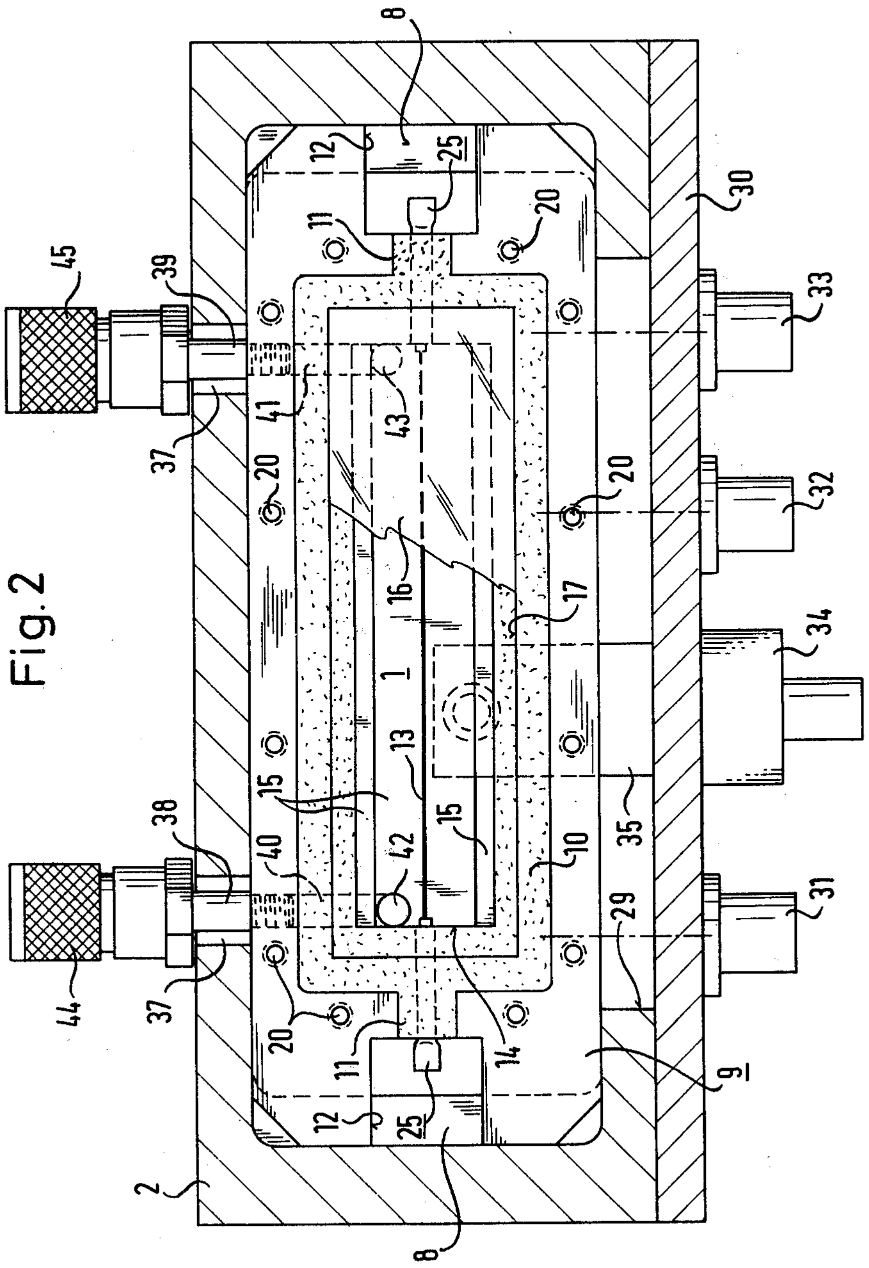
FIG. 2 is a sectional plan view taken along line 2—2 in FIG. 1.

As illustrated in FIGS. 1 and 2 of the drawings, the counter tube with its counting chamber 1 is located within a housing body 2, the latter of which can be closed by means of a cover 3 detachably fastened thereto by means of screws 4. The housing body 2 evidences a screw thread 5 on its base portion for the fastening of the entire counter tube to a vertical support or the like. Within the housing body 2 there is provided an exposure chamber which consists of a lower area 6 and an upper, somewhat wider area 7. Supported on a ledge 8 which separates the lower area 6 of the exposure chamber from its upper area 7 is a support member 9 which fits into the upper exposure chamber 7. Arranged within the support or carrier member 9 is a high-voltage resistant and mechanically rigid sealing compound or resin 10 which acts as the insulating body of the counter tube. As may be ascertained from FIG. 2, the sealing compound extends towards both sides of the support member 9 at 11 up to, respectively, a recess 12 formed in the support member 9, in order to facilitate the hereinbelow detailed electrical connection of the counter tube wire 13 under insulated extension out from the support member 9.

The counting chamber 1 is formed in a hollow 14 within the mechanically rigid sealing compound 10. Inventively, the counting chamber is curved at a constant radius and, namely, concavely as viewed in the direction of the counter tube aperture or window (as shown in FIG. 2). Located within the hollow 14, and correspondingly curved, as the cathode of the counter tube there is either inserted therein or vapor-deposited thereon a trough-shaped metallic layer 15. The counting chamber 1 is covered by means of a curved foil 16, for example, constituted of beryllium, which forms the counter tube window. The foil 16 is fitted into recesses 17 in the sealing compound at the upper edge of the counting chamber 1, and is retained by a cover portion 18 arranged on the support member 9. The cover portion 18 is connected with the support member 9 in a pressure-resistant manner through the screws 19, as indicated in FIG. 1, which fit into screw threads 20 as shown in FIG. 2. The upper surface of the support member 9 and, correspondingly, the lower surface of the cover portion 18 facing thereto are curved in conformance with the curvature of the counting chamber 1. Arranged as an insert in a recess of the cover portion 18 there is provided a mechanically rigid and electrically high-voltage resistant sealing compound 21, in which a seal 22 is located in a groove lying over the interstice between the foil 16 in its recess 17 in the sealing compound 10. The counting chamber 1 is thereby closed in a pressure-resistant manner, notwithstanding its curvature, and the foil 16 of the counter tube window is insulatingly fastened and retained with respect to the support member 9. The cover 3 of the housing body 2 lies on the cover portion 18 in the condition of support member 9 being inserted in the upper area 7 of the recess of the housing body 2, and fixes the support member 9 in the housing body 2. The cover portion 18, as well as the cover 3, have presently an aperture 23 and, respectively, 24 which correspond to the size of the counter tube window in order to facilitate the unhindered access of the radiation which is to be measured to the foil 16 of the counter tube window.

The counter tube wire 13 which is mounted equidistantly with regard to the walls of the cathode-metal trough 15 and the counter tube window 16, but equidistantly displaced against the trough back wall, is arcuately curvedly retained at its ends by means of fastening arrangements 25 described in greater detail hereinbelow with reference to FIG. 3 of the drawings, and which are cast into the sealing compound 10. Connected directly to and electrically with the ends of the fastening arrangements 25 which project externally from the sealing compound 10 into the recesses 12 of the support member 9 are respectively the input resistors 26 of preamplifiers (not shown). The input resistors 26 project downwardly into the lower area 6 of the housing body 2 towards a plate 27 on which there are arranged the amplifier devices 28, schematically shown through only one line. As may be ascertained from FIG. 2, the side of the housing body 2 is provided with an aperture 29 which is closeable through the application of a plate 30, in which there are arranged the schematically illustrated electrical contacts. The electrical inlets and outlets for the amplifiers are designated by reference numerals 31, 32 and 33. Designated by reference numeral 34 is a high-voltage connector, which is connected with a contact plate 35 located within the lower area 6 of the hollow of the housing body 2. Arranged in a bore within the support member 9, and insulated with respect to the latter, is a spring-loaded contact pin 36 which is electrically connected with the cathode-metal trough 15 so that the latter is adapted to receive by means of the connector 35 opposite the counter tube wire 13 a negatively biased high voltage. Provided on the side of the housing body 2 opposite the aperture 29 are upwardly opening apertures 37 through which there extend conduits 38, 39 inserted in the support member 9. Within the support member 9 there continue the conduits 38, 39 in passageways 40, 41, which also traverse the sealing compound 10 and terminate in an inlet aperture 42, or respectively, outlet aperture 43 on the base of the metal trough 15 of the counting chamber 1, so that the counting chamber 1 can have counting chamber gas transmitted thereto in through-flow relationship. The outer ends of the conduits 30, respectively 19, support known self-sealing rapid or snap closures 44, 45 for the connection of the gas infeed and outlet. Since the snap closures 44, 45 are self-sealing, after suitable gas filling of the counting chamber 1, the counter tube can also be operated under static counter tube gas pressure.

Figure 3:
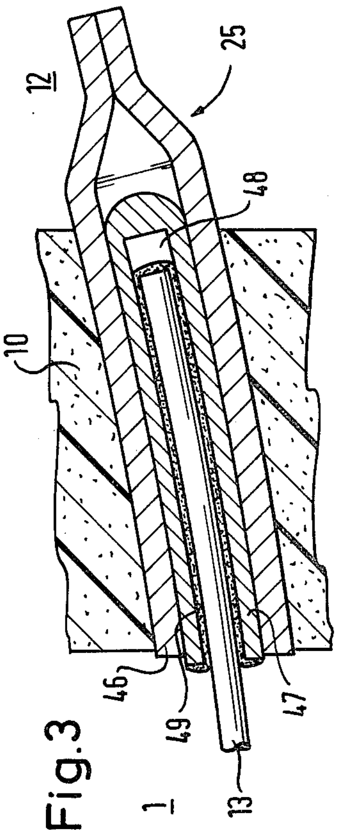
FIG. 3 is an enlarged scale schematic sectional view of one of the fastening arrangements for the counter tube wire.

The fastening arrangement 25 for the curved counter tube wire 13, which is illustrated on an enlarged scale in FIG. 3, encompasses a sleeve 46 which is cast into the sealing compound or resin 10, which at its end projecting externally into the recess 12 of the support member 9 is compressed or crushed and electrically connected with the input resistor 36. A plug 37 is inserted into the sleeve 46 in the side of the counting chamber 1, and which evidences a bore 48 whose diameter is only slightly larger than the diameter of the counter tube wire 13. The counter tube wire 13 carries at the end thereof, which is intended to be fitted into the bore 48 of the plug 47, a thin metal coating 49 which, in turn, is soldered in the bore 48 of the sleeve 47. In this manner it is possible that the quartz wire, which cannot be soldered and which is utilized as the counter tube wire 13, can be connected with the plug whereby, through the bore 48 in the plug 47 and the precise guidance of plug 47 in the sleeve 46 there is afforded a precise adjustment and mounting of the counter tube wire 13 in the counting chamber 1. As may be ascertained, the sleeve 46 and the plug 47 with the bore 48 have exactly the same constant curvature as that of the counting chamber 1, so that the spring-elastic counter tube wire, which at its ends extend for a sufficient length into the bores 48, can be gripped and with the desired constant curvature held arcuately tensed. For some applications it can be sufficient when the sleeve 46, the plug 47 and the bore 48 are not curved, that the bore which retains the wire end must terminate in the counting chamber precisely to the curvature of the latter. Nevertheless, it is possible to effect a replacement of the counter tube wire 13 through the pulling out of the plugs 47 from the sleeves 46 and the replacement by another counter tube wire with correspondingly arranged plugs 47 at its ends. Hereby, it may be noted that the illustrated representation, in particular the counter tube wire 13, is largely exaggerated in contrast with the other components at the counter tube, since the counter tube wire has a diameter only about 25 μm.

What is claimed is:

1. In a curved positionally-sensitive proportional counter tube having a counting chamber; an insulating member in said counting chamber; a trough-shaped metallic layer lining said insulating member to form a cathode; a counter tube window extending along the longitudinal side of said counting chamber; a radiation transmissive foil gas-tightly covering said window; and a counter tube wire forming an anode, said wire traversing said counting chamber in the longitudinal direction thereof and being mounted equidistantly spaced from said metallic trough side walls and being fastened at both ends thereof to the electrical elements of preamplifiers, the improvement comprising: said counting chamber being bent along its longitudinal axis at a constant rate of curvature, said counter tube wire being a spring-elastic wire; and fastening means for gripping both ends of said wire for mounting said wire in a curved position in conformance with the curvature of said counting chamber and of said cathode-trough, and maintaining said wire asymmetrically from said counter tube window and equidistantly relative to said cathode trough base surface.

2. A counter tube as claimed in claim 1, said metallic layer being set into said insulating member.

3. A counter tube as claimed in claim 1, said metallic layer being vapor-deposited on said insulating member.

4. A counter tube as claimed in claim 1, each said fastening means for said wire comprising a gripping means cast into the sealing compound of said insulating member centrally of the cathode trough cross-section, said gripping means being curved in conformance with the constant rate of curvature of said counting chamber, said counter tube wire ends extending for a predetermined length into a curved central bore in said gripping means and being soldered therein.

5. A counter tube as claimed in claim 4, said gripping means comprising a sleeve extending through the front wall of said insulating member; and a contact plug engageable in said sleeve having said curved bore therein for receiving the counter tube wire end whereby said fastening means are adapted to be detached and replaced.

6. A counter tube as claimed in claim 1, said counting chamber being an openable high-pressure chamber having inlet and outlet apertures for a counter tube gas under high pressure, said counter tube wire ends being directly electrically connected at both ends thereof through said fastening means with, respectively, the input resistor of a preamplifier.

* * * * *